United States Patent
Godo

(10) Patent No.: US 10,249,912 B1
(45) Date of Patent: Apr. 2, 2019

(54) ELECTRICAL CONTROL SYSTEM

(71) Applicant: LG Chem, Ltd., Seoul (KR)

(72) Inventor: Edvin Godo, Troy, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/038,266

(22) Filed: Jul. 18, 2018

(51) Int. Cl.
| | | |
|---|---|---|
| *G08B 21/00* | (2006.01) | |
| *H01M 10/42* | (2006.01) | |
| *B60R 16/033* | (2006.01) | |
| *B60L 11/18* | (2006.01) | |
| *B60R 16/023* | (2006.01) | |

(52) U.S. Cl.
CPC ....... *H01M 10/425* (2013.01); *B60L 11/1851* (2013.01); *B60R 16/0232* (2013.01); *B60R 16/033* (2013.01); *B60L 2240/547* (2013.01); *H01M 2010/4271* (2013.01); *H01M 2010/4278* (2013.01)

(58) Field of Classification Search
CPC .......................... H01M 10/425; H01M 10/482
USPC ........... 340/636.15, 639, 540, 541, 106, 116, 340/122, 130, 135
See application file for complete search history.

(56) References Cited

U.S. PATENT DOCUMENTS

| | | | |
|---|---|---|---|
| 8,861,161 B2 | 10/2014 | Grupido | |
| 2015/0323603 A1* | 11/2015 | Kim | H01M 10/625 702/58 |
| 2018/0024172 A1 | 1/2018 | Katrak | |
| 2018/0278067 A1* | 9/2018 | Mizoguchi | H02J 7/0021 |

OTHER PUBLICATIONS

U.S. Appl. No. 15/814,665, filed Nov. 16, 2017 entitled Electrical Control System.

\* cited by examiner

*Primary Examiner* — Tai T Nguyen
(74) *Attorney, Agent, or Firm* — Buckert Patent & Trademark Law Firm PC; John F. Buckert

(57) ABSTRACT

An electrical control system having a primary microcontroller, a secondary microcontroller, a slave IC, and a communication IC is provided. The communication IC sets a fault line to a first logic level indicating that an overvoltage condition has been detected in a battery cell. The secondary microcontroller sends a message to the primary microcontroller via a communication bus indicating that the overvoltage condition has been detected in response to the fault line having the first logic level. The primary microcontroller determines that both the message from the second microcontroller was received and the fault line has the first logic level to confirm that the communication bus is functioning as desired and that the secondary microcontroller is functioning as desired.

7 Claims, 3 Drawing Sheets

ELECTRICAL CONTROL SYSTEM

BACKGROUND

The inventor herein has recognized a need for an improved electrical control system for a vehicle utilizing a primary microcontroller that induces a slave IC to report an overvoltage condition in a battery cell and to thereafter confirm whether a secondary microcontroller reports the overvoltage condition to the primary microcontroller. If not, then the primary microcontroller determines that the secondary microcontroller or a communication bus therebetween is malfunctioning.

SUMMARY

An electrical control system in accordance with an exemplary embodiment is provided. The electrical control system includes a primary microcontroller that receives a first message with a voltage value from a slave IC via a communication IC. The voltage value is indicative of a voltage level of a battery cell. The primary microcontroller sends a second message with a maximum desired voltage threshold value to the slave IC via the communication IC. The maximum desired voltage threshold value is less than the voltage value. The slave IC sends a third message with an overvoltage flag to the primary microcontroller via the communication IC. The overvoltage flag indicates an overvoltage condition has been detected in the battery cell. The communication IC sets a fault line to a first logic level indicating that the overvoltage condition has been detected in response to the overvoltage flag. The secondary microcontroller sends a fourth message to the primary microcontroller via a communication bus indicating that the overvoltage condition has been detected in response to the fault line having the first logic level. The primary microcontroller determines that both the fourth message was received and the fault line has the first logic level to confirm that the communication bus is functioning as desired and that the secondary microcontroller is functioning as desired.

DETAILED DESCRIPTION

Figure 1:
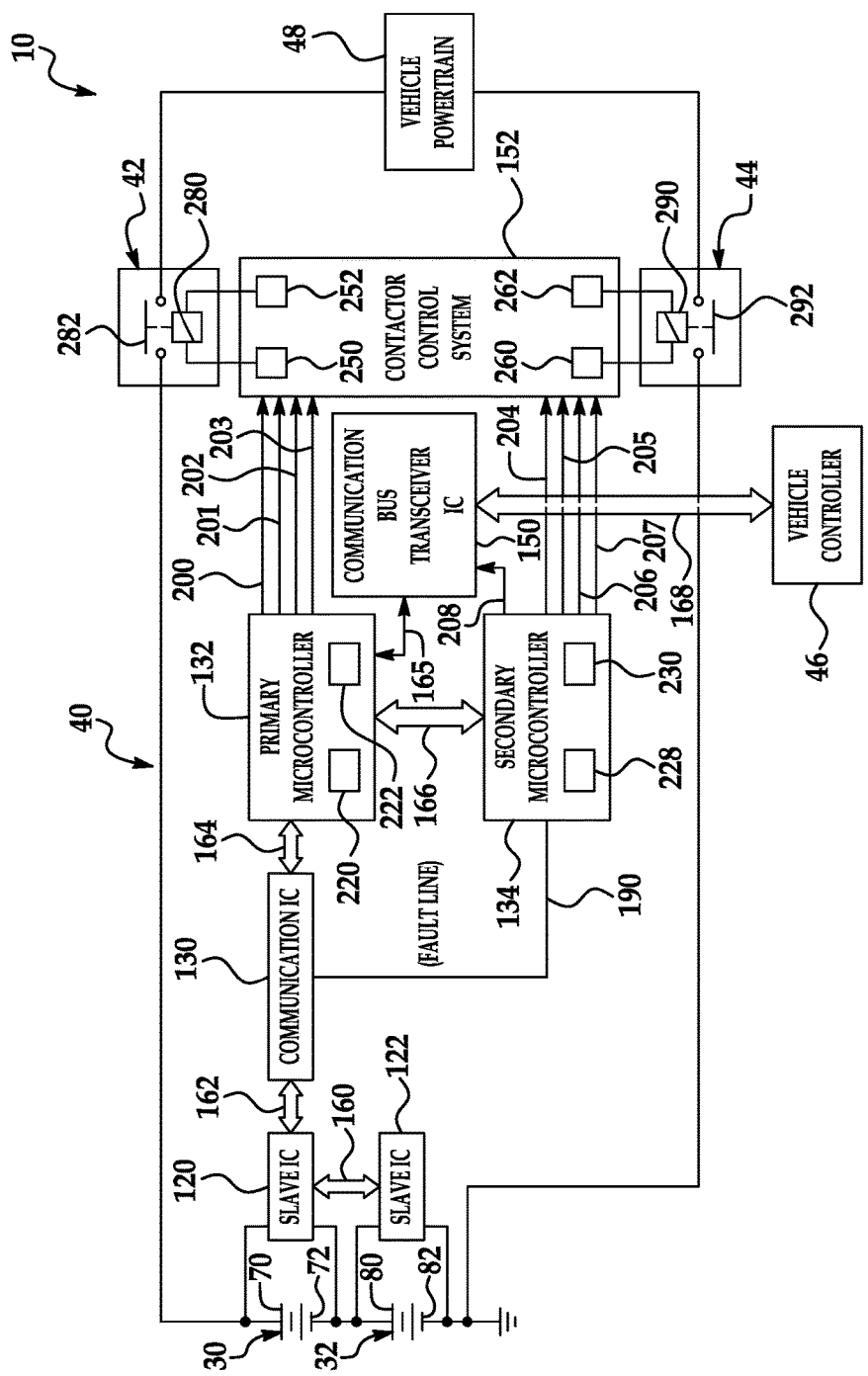
FIG. 1 is a schematic of a vehicle having an electrical control system in accordance with an exemplary embodiment.

Referring to FIG. 1, a vehicle 10 is provided. The vehicle 10 includes a battery cell 30, a battery cell 32, an electrical control system 40, contactors 42, 44, a vehicle controller 46, and a vehicle powertrain 48.

An advantage of the electrical control system 40 is that the system 40 has a primary microcontroller 132 that induces a slave IC 120 to report an overvoltage condition in a battery cell 30 and to thereafter confirm whether a secondary microcontroller 134 reports the overvoltage condition to the primary microcontroller 132. If not, then the primary microcontroller 132 determines that the secondary microcontroller 134 or a communication bus 166 therebetween is malfunctioning and then takes a safe action.

For purposes of understanding, some of the terms utilized herein will be described.

The term "node" or "electrical node" is a region or a location in an electrical circuit.

The term "signal" refers to one of an electrical voltage, an electrical current, and a binary value.

The term "IC" refers to an integrated circuit.

The term "low logic level" corresponds to a voltage level representing a binary 0.

The term "high logic level" corresponds to a voltage level representing a binary 1.

The battery cell 30 has a positive terminal 70 and a negative terminal 72. In an exemplary embodiment, the battery cell 30 generates a predetermined voltage level between the positive terminal 70 and the negative terminal 72. The positive terminal 70 is electrically coupled to a first side of the contactor 42. The negative terminal 72 is electrically coupled to a positive terminal 80 of the battery cell 32.

The battery cell 32 has a positive terminal 80 and a negative terminal 82. In an exemplary embodiment, the battery cell 32 generates a predetermined voltage level between the positive terminal 80 and the negative terminal 82. The positive terminal 80 is electrically coupled to the negative terminal 72 of the battery cell 30. The negative terminal 82 is electrically coupled to a first side of the contactor 44 and to electrical ground. In an alternative embodiment, it is noted that additional battery cells could be coupled electrically in series with the battery cells 30, 32.

The electrical control system 40 is provided to monitor output voltages of the battery cells 30, 32, and to determine whether the secondary microcontroller 134 and the communication bus 166 are operating as desired, and to control operation of the contactors 42, 44. The electrical control system 40 includes a slave IC 120, a slave IC 122, a communication IC 130, a primary microcontroller 132, a secondary microcontroller 134, a communication bus transceiver IC 150, a contactor control system 152, communication busses 160, 162, 164, 165, 166, 168, a fault line 190, and control lines 200, 201, 202, 203, 204, 205, 206, 207.

The slave IC 120 monitors a voltage of the battery cell 30. The slave IC 120 is electrically coupled to and between the positive terminal 70 and the negative terminal 72 of the battery cell 30. Further, the slave IC 120 is operably coupled to both the communication bus 162 and the communication bus 160. The slave IC 120 communicates with the communication IC 130 utilizing the communication bus 162. Further, the slave IC 120 communicates with the slave IC 122 utilizing the communication bus 160. If the slave IC 120 determines that an output voltage of the battery cell 30 has an overvoltage condition (i.e., the output voltage level is greater than a maximum desired voltage threshold value that is set by the primary microcontroller 132), then the slave IC 120 generates a message having a voltage value indicating a measured voltage level of the battery cell 30, and an overvoltage flag having a fault value that indicates that the battery cell 30 has an overvoltage condition. The message is sent through the communication bus 162 to the communication IC. Also, if the slave IC 120 receives a message from the slave IC 122 having a voltage value indicating a measured voltage level of the battery cell 32, and an overvoltage flag having the fault value indicating that the battery cell 32 has an overvoltage condition, then the slave IC 120 generates a message having a voltage value indicating a measured voltage level of the battery cell 32, and an overvoltage flag indicating that the battery cell 32 has an overvoltage condition, that is sent through the communication bus 162 to the communication IC.

The slave IC 122 monitors a voltage of the battery cell 32. The slave IC 122 is electrically coupled to and between the positive terminal 80 and the negative terminal 82 of the battery cell 32. Further, the slave IC 122 is operably coupled to the communication bus 160. If the slave IC 122 determines that an output voltage of the battery cell 32 has an overvoltage condition (i.e., the output voltage level is greater than a maximum desired voltage threshold value that is set by the primary microcontroller 132), then the slave IC 122 generates a message having a voltage value indicating a measured voltage level of the battery cell 32, and an overvoltage flag having a fault value indicating that the battery cell 32 has an overvoltage condition, that is sent through the communication bus 160 to the slave IC 120.

The communication IC 130 is operably coupled to the communication bus 162, the communication bus 164, and the fault line 190. When the communication IC 130 receives a message from the slave IC 120 via the communication bus 162, the communication IC 130 sends the message through the communication bus 164 to the primary microcontroller 132. Further, when a message from the slave IC 120 indicates an overvoltage condition of the battery cell 30 or the battery cell 32, the communication IC 130 sets the fault line 190 to a high logic level indicating an overvoltage condition has been detected. Otherwise, the communication IC 130 sets the fault line 190 to a low logic level.

The primary microcontroller 132 is operably coupled to the communication bus 164, the communication bus 165, and the control lines 200, 201, 202, 203. The primary microcontroller 132 includes a microprocessor 220 that is operably coupled to a memory device 222. The memory device 222 stores data and software instructions for performing the operational steps of the primary microcontroller 132 described hereinafter. The primary microcontroller 132 communicates with the communication IC 130 utilizing the communication bus 164. Further, the primary microcontroller 132 communicates with the secondary microcontroller 134 utilizing the communication bus 166. Also, the primary microcontroller 132 communicates with the communication bus transceiver IC 150 utilizing the communication bus 165.

The primary microcontroller 132 generates first and second control signals on the control lines 200, 201, respectively to command the voltage drivers 250, 252, respectively, in the contactor control system 152 to energize a coil 280 in the contactor 42 to transition a contact 282 in the contactor 42 to a closed operational state. Alternately, the primary microcontroller 132 generates third and fourth control signals on the control lines 200, 201, respectively to command the voltage drivers 250, 252, respectively, in the contactor control system 152 to de-energize the coil 280 in the contactor 42 to transition the contact 282 in the contactor 42 to an open operational state.

Further, the primary microcontroller 132 generates third and fourth control signals on the control lines 202, 203, respectively to command the voltage drivers 260, 262, respectively, in the contactor control system 152 to energize a coil 290 in the contactor 44 to transition a contact 292 in the contactor 44 to a closed operational state. Alternately, the primary microcontroller 132 can generate fifth and sixth control signals on the control lines 202, 203, respectively to command the voltage drivers 260, 262, respectively, in the contactor control system 152 to de-energize the coil 290 in the contactor 42 to transition the contact 282 in the contactor 42 to an open operational state.

The primary microcontroller 132 communicates with the communication bus transceiver IC 150 utilizing the communication bus 165. Further, the primary microcontroller 132 communicates with the vehicle controller 46 utilizing the communication bus 165, the communication bus transceiver IC 150, and the communication bus 168. The additional functionality of the primary microcontroller 132 will be described in greater detail hereinafter.

The secondary microcontroller 134 is operably coupled to the communication bus 166, the fault line 190, and the control lines 204, 205, 206, 207, 208. The secondary microcontroller 134 includes a microprocessor 228 that is operably coupled to a memory device 230. The memory device 230 stores data and software instructions for performing the operational steps of the secondary microcontroller 134 described hereinafter. The secondary microcontroller 134 communicates with the primary microcontroller 132 utilizing the communication bus 166.

Further, the secondary microcontroller 134 generates first and second control signals on the control lines 204, 205, respectively to command the voltage drivers 250, 252, respectively, in the contactor control system 152 to energize a coil 280 in the contactor 42 to transition a contact 282 in the contactor 42 to a closed operational state. Alternately, the secondary microcontroller 134 generates third and fourth control signals on the control lines 204, 205, respectively, to command the voltage drivers 250, 252, respectively, in the contactor control system 152 to de-energize the coil 280 in the contactor 42 to transition the contact 282 in the contactor 42 to an open operational state.

Also, the secondary microcontroller 134 generates third and fourth control signals on the control lines 206, 207, respectively to command the voltage drivers 260, 262, respectively, in the contactor control system 152 to energize a coil 290 in the contactor 44 to transition a contact 292 in the contactor 44 to a closed operational state. Alternately, the primary microcontroller 132 generates fifth and sixth control signals on the control lines 206, 207, respectively to command the voltage drivers 260, 262, respectively, in the contactor control system 152 to de-energize the coil 290 in the contactor 42 to transition the contact 282 in the contactor 42 to an open operational state.

Further, the secondary microcontroller 134 generates an enable control signal on the control line 208 having a first logic level to enable operation of the communication bus transceiver IC 150. Further, the secondary microcontroller 134 generates a disable control signal on the control line 208 having a second logic level to disable operation of the communication bus transceiver IC 150. The additional functionality of the secondary microcontroller 134 will be described in greater detail hereinafter.

The communication bus transceiver IC 150 is utilized to facilitate communication between the primary microcontroller 132 and the vehicle controller 46. When the communication bus transceiver IC 150 receives an enable control signal from the secondary microcontroller 134, the communication bus transceiver IC 150 allows messages to be transmitted between the primary microcontroller 132 and the vehicle controller 46. Alternately, when the communication bus transceiver IC 150 receives a disable control signal from the secondary microcontroller 134, the communication bus transceiver IC 150 does not transmit messages between the primary microcontroller 132 and the vehicle controller 46. The communication bus transceiver IC 150 is operably coupled to the communication bus 165 which is further operably coupled to the primary microcontroller 132. Further, the communication bus transceiver IC 150 is operably coupled to the communication bus 168 which is further operably coupled to the vehicle controller 46.

The contactor control system 152 is provided to control operation of the contactors 42, 44. The contactor control system 152 is operably coupled to the primary microcontroller 132, the secondary microcontroller 134, the contactor 42, and the contactor 44. The contactor control system 152 includes voltage drivers 250, 252, 260, 262. Further, the voltage drivers 250, 252 are electrically coupled to the contactor coil 280 of the contactor 42. During operation, when the voltage drivers 250, 252 energize the contactor coil 280, the contact 282 transitions to a closed operational state. Alternately when the voltage drivers 250, 252 de-energize the contactor coil 280, the contact 282 transitions to an open operational state. When the voltage drivers 260, 262 energize the contactor coil 290, the contact 292 transitions to a closed operational state. Alternately when the voltage drivers 260, 262 de-energize the contactor coil 290, the contact 292 transitions to an open operational state.

The contactors 42, 44 are provided to energize the vehicle powertrain 48 when the contactors 42, 44 each have a closed operational state, and to de-energize the vehicle powertrain 48 when the contactors 42, 44 each have an open operational state.

The contactor 42 includes the contactor coil 280 and the contact 282. The contactor coil 280 is electrically coupled to the voltage drivers 250, 252. The contact 282 is electrically coupled between the positive terminal of the battery cell 30 and a first end of the vehicle powertrain 48.

The contactor 44 includes the contactor coil 290 and the contact 292. The contactor coil 290 is electrically coupled to the voltage drivers 260, 262. The contact 292 is electrically coupled between the negative terminal 82 of the battery cell 32 and a second end of the vehicle powertrain 48.

The fault line 190 is an electrical line that is electrically coupled to and between the communication IC 130 and the secondary microcontroller 134. The communication IC 130 transitions the fault line to a first logic level when an overvoltage condition has been detected in the first battery cell 30 or the second battery cell 32. Otherwise, the communication IC 130 sets the fault line to a second logic level.

In an alternative embodiment, the vehicle 10 includes a plurality of additional battery cells coupled in series with the battery cells 30, 32. Further, the electrical control system 40 includes a plurality of additional slave ICs that monitor voltages of the plurality of additional battery cells, and which communicate with one another and also communicate with the slave ICs 120, 122.

Figure 2:
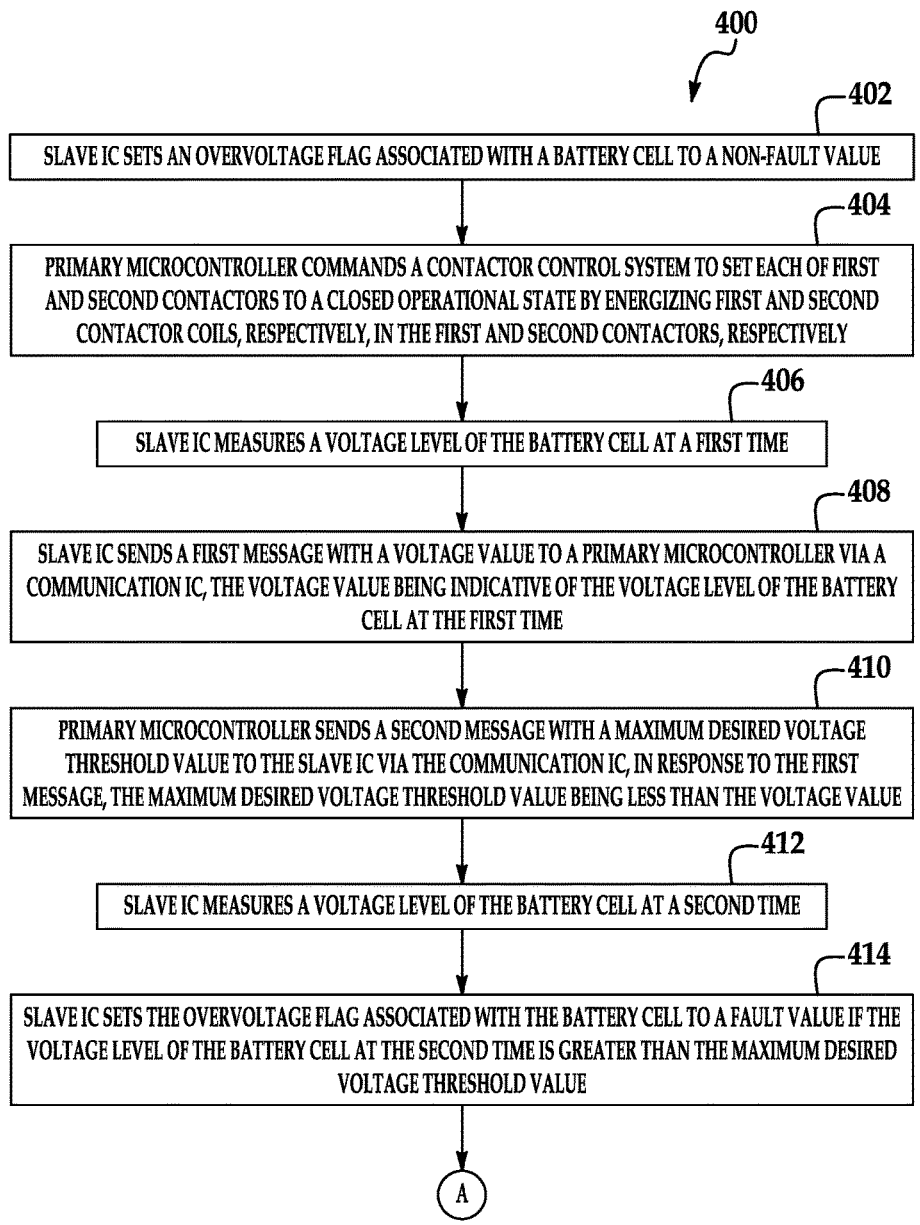
FIGS. 2-3 are flowcharts of a method for determining whether a secondary controller and a communication bus in the electrical control system of FIG. 1 are operating as desired, in accordance with another exemplary embodiment.
Figure 3:
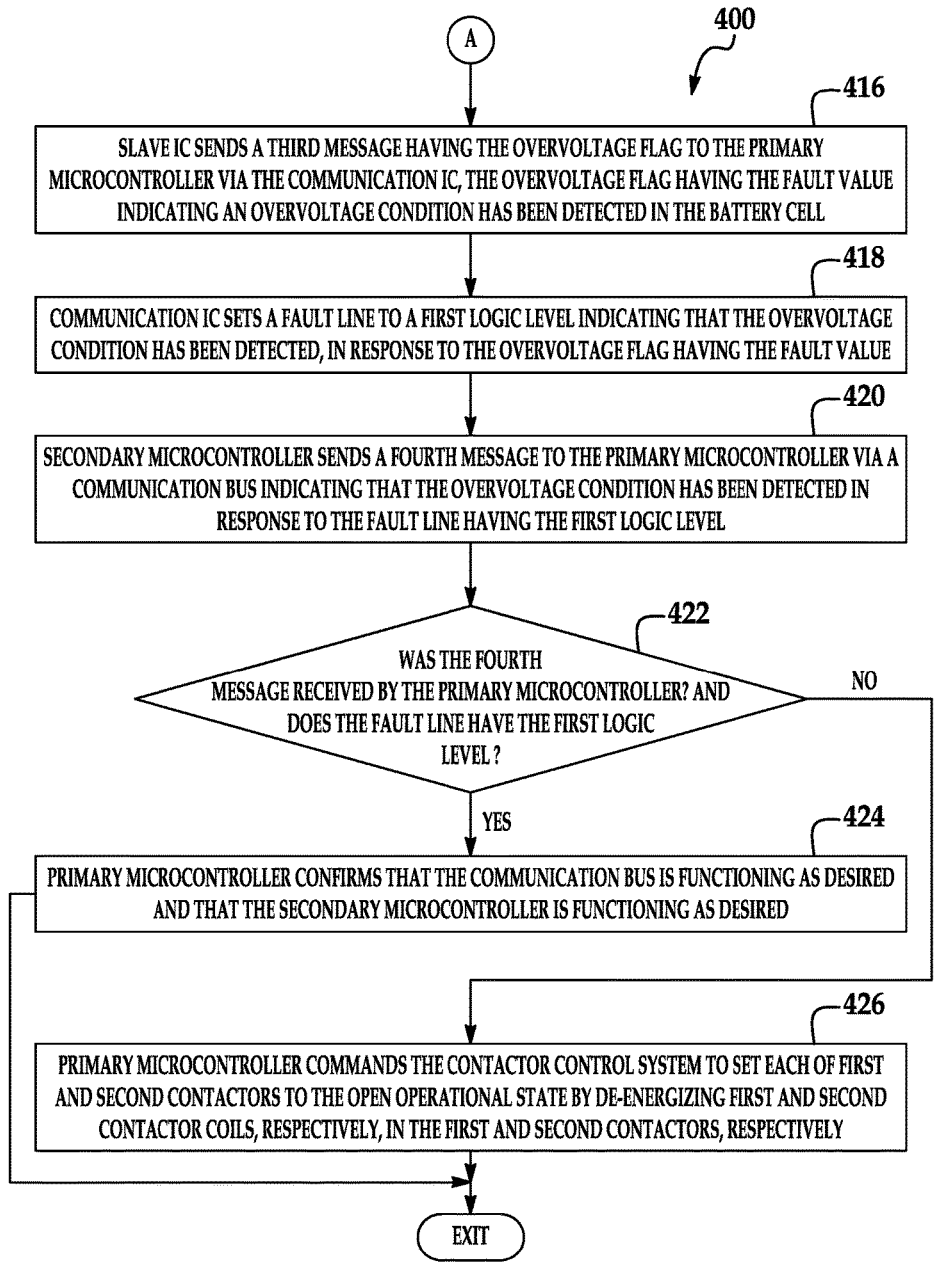

Referring to FIGS. 1-3, a flowchart of a method 400 for determining whether the secondary microcontroller 134 and the communication bus 166 are operating as desired will now be explained.

At step 402, the slave IC 120 sets an overvoltage flag associated with a battery cell 30 to a non-fault value.

At step 404, the primary microcontroller 132 commands a contactor control system 152 to set each of first and second contactors 42, 44 to a closed operational state by energizing first and second contactor coils 280, 290, respectively, in the first and second contactors 42, 44, respectively.

At step 406, the slave IC 120 measures a voltage level of the battery cell 30 at a first time.

At step 408, the slave IC 120 sends a first message with a voltage value to a primary microcontroller 132 via a communication IC 130. The voltage value is indicative of the voltage level of the battery cell 30 at the first time.

At step 410, the primary microcontroller 132 sends a second message with a maximum desired voltage threshold value to the slave IC 120 via the communication IC 130, in response to the first message. The maximum desired voltage threshold value is less than the voltage value.

At step 112, the slave IC 120 measures a voltage level of the battery cell 30 at a second time.

At step 414, the slave IC 120 sets the overvoltage flag associated with the battery cell 30 to a fault value if the voltage level of the battery cell 30 at the second time is greater than the maximum desired voltage threshold value.

At step 416, the slave IC 120 sends a third message having the overvoltage flag to the primary microcontroller 132 via the communication IC 130. The overvoltage flag has the fault value indicating an overvoltage condition has been detected in the battery cell 30.

At step 418, the communication IC 130 sets a fault line to a first logic level indicating that the overvoltage condition has been detected, in response to the overvoltage flag having the fault value.

At step 420, the secondary microcontroller 134 sends a fourth message to the primary microcontroller 132 via a communication bus indicating that the overvoltage condition has been detected in response to the fault line having the first logic level.

At step 422, the primary microcontroller 132 makes a determination as to whether the fourth message was received by the primary microcontroller 132, and whether the fault line 190 has the first logic level. If the value of step 422 equals "yes", the method advances to step 424. Otherwise, the method advances to step 426.

At step 424, the primary microcontroller 132 confirms that the communication bus 166 is functioning as desired and that the secondary microcontroller 134 is functioning as desired. After step 424, the method is exited.

At step 426, the primary microcontroller 132 commands the contactor control system 152 to set each of first and second contactors 42, 44 to the open operational state by de-energizing first and second contactor coils 280, 290, respectively, in the first and second contactors 42, 44, respectively. After step 426, the method is exited.

The electrical control system described herein provides a substantial advantage over other control systems. In particular, the electrical control system has a primary microcontroller that induces a slave IC to report an overvoltage condition in a battery cell and to thereafter confirm whether a secondary microcontroller reports the overvoltage condition to the primary microcontroller. If not, then the primary microcontroller determines that the secondary microcontroller or a communication bus therebetween is malfunctioning and then takes a safe action.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An electrical control system, comprising:
a primary microcontroller receiving a first message with a voltage value from a slave IC via a communication IC, the voltage value being indicative of a voltage level of a battery cell;
the primary microcontroller sending a second message with a maximum desired voltage threshold value to the slave IC via the communication IC, the maximum desired voltage threshold value being less than the voltage value;
the slave IC sending a third message with an overvoltage flag to the primary microcontroller via the communication IC, the overvoltage flag indicating an overvoltage condition has been detected in the battery cell;
the communication IC setting a fault line to a first logic level indicating that the overvoltage condition has been detected in response to the overvoltage flag;
the secondary microcontroller sending a fourth message to the primary microcontroller via a communication bus indicating that the overvoltage condition has been detected in response to the fault line having the first logic level; and
the primary microcontroller determining that both the fourth message was received and the fault line has the first logic level to confirm that the communication bus is functioning as desired and that the secondary microcontroller is functioning as desired.

2. The electrical control system of claim 1, wherein the communication IC operably communicates with the slave IC and the primary microcontroller.

3. The electrical control system of claim 1, further comprising a contactor control system operably coupled to the primary microcontroller and to first and second contactors.

4. The electrical control system of claim 3, wherein the primary microcontroller commanding the contactor control system to set each of the first and second contactors to an open operational state, if the fourth message was not received by the primary microcontroller or the fault line does not have the first logic level.

5. The electrical control system of claim 4, wherein the contactor control system sets each of first and second contactors to the open operational state by de-energizing first and second contactor coils, respectively, in the first and second contactors, respectively.

6. The electrical control system of claim 1, wherein the primary microcontroller sets the maximum desired voltage threshold value to a value that is less than the voltage value such that the slave IC will subsequently report the overvoltage condition.

7. The electrical control system of claim 1, wherein the fault line is electrically coupled to and between the communication IC and the secondary microcontroller.

* * * * *